United States Patent  (10) Patent No.: US 9,392,132 B1
Iwasaki  (45) Date of Patent: Jul. 12, 2016

(54) TRANSITIONING A SETTING OPERATION SCREEN OF AN IMAGE FORMING APPARATUS

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Takao Iwasaki, Tokyo (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/662,437

(22) Filed: Mar. 19, 2015

(51) Int. Cl.
G06F 3/12 (2006.01)
H04N 1/00 (2006.01)

(52) U.S. Cl.
CPC ....... *H04N 1/00503* (2013.01); *H04N 1/00411* (2013.01); *H04N 1/00413* (2013.01); *H04N 1/00474* (2013.01); *H04N 1/00482* (2013.01)

(58) Field of Classification Search
None
See application file for complete search history.

(56) References Cited

U.S. PATENT DOCUMENTS

2015/0288836 A1* 10/2015 Kanki ................ H04N 1/00514
358/1.13

FOREIGN PATENT DOCUMENTS

JP 2005074716 A * 3/2005

* cited by examiner

*Primary Examiner* — Thomas D Lee
(74) *Attorney, Agent, or Firm* — Amin, Turocy & Watson LLP

(57) ABSTRACT

A display apparatus includes an input unit, a display unit, and a control unit. The display unit displays a first setting screen which is for receiving a setting value of a job inserted into an image forming apparatus and displays execution in a first operational environment. The display unit displays a second setting screen which is for receiving a setting value of the job, displays execution in a second operational environment different from the first operational environment, and displays a smaller number of setting items than that of the first setting screen. The control unit controls the display unit to display the second setting screen, and controls the display unit to display the first setting screen obtained by applying a setting value which is input by the input unit and obtained through the second setting screen when the user presses a defined button in the second setting screen.

4 Claims, 5 Drawing Sheets

TRANSITIONING A SETTING OPERATION SCREEN OF AN IMAGE FORMING APPARATUS

FIELD

Embodiments described herein relate generally to a technology for transitioning a setting operation screen of an image forming apparatus.

BACKGROUND

In the related art, a new product to which a setting operation such as a simple copy mode is added in order to simplify an operation for copying and the like was released. Such a simple operation only has a frequently used setting operation and is to allow ease of use. Thus, a user interface (operation screen) for the simple operation, which is different from that for a conventional operation, is included. There is a case in which a simple operation screen is displayed in an operational environment which is different from that of a conventional operation screen as in a case where the conventional operation screen is created by using the C/C++ language, and the simple operation screen is created by using the web-based HTML5.

When setting of a complex job parameter is required, the setting is performed through a conventional operation which enables setting of all parameters. However, setting positioned intermediately between the simple operation and the conventional operation has no choice but to be performed through the conventional operation. Accordingly, switching from the simple operation screen to the conventional operation screen is required.

However, when switching from the simple operation screen to the conventional operation screen is performed, parameters set through the simple operation so far are not taken over. When a screen is switched to the conventional operation screen, the same setting values previously set in the simple operation screen are to be input again.

DETAILED DESCRIPTION

A display apparatus according to an exemplary embodiment includes an input unit, a display unit, and a control unit. The input unit obtains data from a user in accordance with an operation of the user. The display unit displays a first setting screen which is for receiving a setting value of a job inserted into an image forming apparatus and displays execution in a first operational environment. The display unit displays a second setting screen which is for receiving a setting value of the job, displays execution in a second operational environment different from the first operational environment, and displays a smaller number of setting items than that of the first setting screen. The control unit controls the display unit to display the second setting screen, and controls the display unit to display the first setting screen obtained by applying a setting value which is input by the input unit and obtained through the second setting screen when a defined button is pressed on the second setting screen by the user. In the exemplary embodiment, a button for transitioning a simple operation to a conventional operation is provided on a simple operation screen in order to perform setting of an item which cannot be set on the simple operation screen, on a conventional operation screen. The display apparatus according to the exemplary embodiment takes a job parameter which is set through the simple operation, over when an operation screen becomes the conventional operation screen and the display apparatus continues to use the job parameter. Accordingly, it is possible to continuously set a complex parameter.

Hereinafter, the exemplary embodiment will be described with reference to the accompanying drawings.

Figure 1:
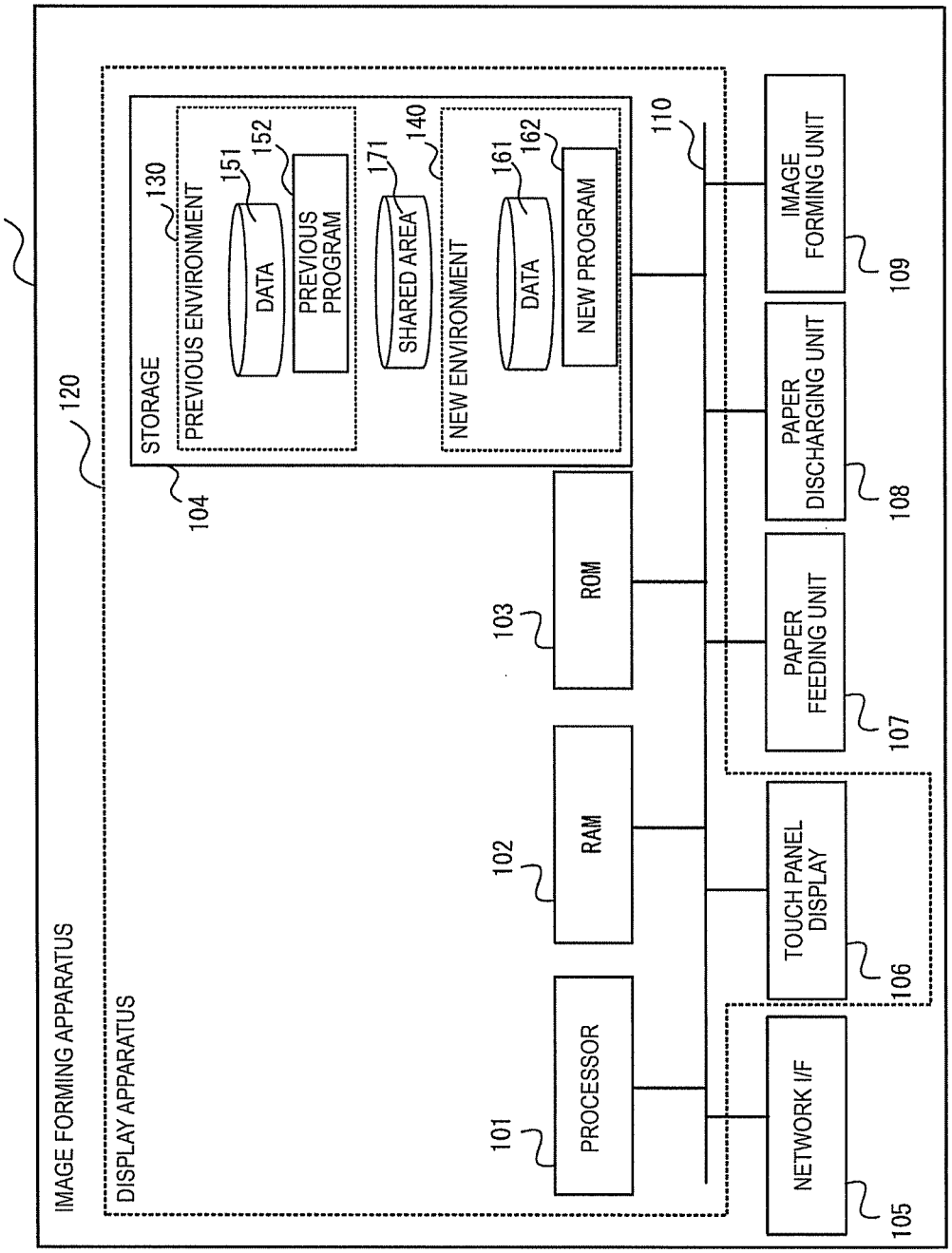
FIG. 1 is a block diagram illustrating a configuration example of an image forming apparatus which includes a display apparatus according to an exemplary embodiment.

FIG. 1 is a block diagram illustrating an example when a display apparatus according to the exemplary embodiment is applied to an image forming apparatus. The image forming apparatus 100 includes a display apparatus 120, a network I/F 105, a paper feeding unit 107, a paper discharging unit 108, and an image forming unit 109. The network I/F 105 corresponds to a unit configured to receive a print job from a client apparatus (computer) which performs a print request, and to control a response of an execution result of the job and notification of a status of the image forming apparatus 100. The network I/F 105 includes a network interface card made in accordance with standards of wired communication or wireless communication.

The paper feeding unit 107 includes a tray or a cassette for loading a sheet and includes a pickup roller for supplying a loaded sheet to the image forming apparatus 100. The paper discharging unit 108 loads a sheet on which image formation is performed in a main body of the image forming apparatus 100. The image forming unit 109 corresponds to a unit configured to form print data received from the client apparatus or an original sheet disposed on an auto-document feeder (ADF), on a sheet supplied from the paper feeding unit 107 and to perform transportation to the paper discharging unit 108.

The display apparatus 120 includes a processor 101, a random access memory (RAM) 102, a read only memory (ROM) 103, a hard disk drive (HDD) 104, and a touch panel display 106 and includes a bus 110 for performing an input and output between units in the image forming apparatus 100. The processor 101 corresponds to a computation device such as a central processing unit (CPU) and corresponds to the control unit in the exemplary embodiment. The processor 101 develops and executes a program stored in the ROM 103 or a program stored in the HDD 104, in the RAM 102, and thus provides various functions while cooperation with each of hardware is performed. The RAM 102 corresponds to a main storage device and the ROM 103 corresponds to a non-volatile device storing a system program and the like. The touch panel display 106 includes a flat liquid crystal screen (display unit) and a touch panel (input unit). The touch panel display 106 has a structure in which the touch panel is stacked on the liquid crystal screen and corresponds to a unit configured to enable an input by directly pressing the screen with a fingertip, a pen point, or the like.

The HDD 104 corresponds to a non-volatile auxiliary storage device storing data or a program. In the exemplary embodiment, a first environment of receiving display control or an input operation on the conventional operation screen is referred to as a previous environment 130, and a second environment of receiving display control or an input operation on the simple operation screen is referred to as a new environment 140. Hereinafter, a different level between the previous environment 130 and the new environment 140 will be described, but the different level is only an example.

An operating system (OS) level is different between the previous environment 130 and the new environment 140. In this case, the processor 101 is configured by a plurality of cores and causes each OS to be executed in an individual core.

The previous environment 130 is set to be a past environment of executing a program itself compiled in C/C++ and another new environment 140 is set to be an environment of executing the program on a virtual machine or an inter-printer.

The previous environment 130 is set to be a past environment of executing a program itself compiled in C/C++ and another new environment 140 is set to be an environment of receiving screen control or a screen operation based on a web (HTML5 language).

In this manner, the previous environment 130 and the new environment 140 have structures in which operation methods are different from each other when a module is performed. Further, combination may be differently performed, for example, the previous environment 130 is set to be a web-based environment and the new environment 140 is set to be a virtual environment, and the like.

The HDD 104 stores a previous program 152 operated in the previous environment 130 and data 151, and stores a new program 162 operated in the new environment 140 and data 161. The data 151 and data 161 correspond to data for defining a layout of a display screen, icon image data, and the like.

Terms indicating previousness and newness of "new environment", "new", "previous environment", "previous" are appropriately provided.

The HDD 104 has a shared area 171. The shared area 171 is constructed to have a file system which enables reading and writing from the two environments of the previous environment 130 and the new environment 140, and is mounted. That is, in exemplary embodiment, data can be transferred between the two different environments of the previous environment 130 and the new environment 140 through the shared area 171.

Figure 2:
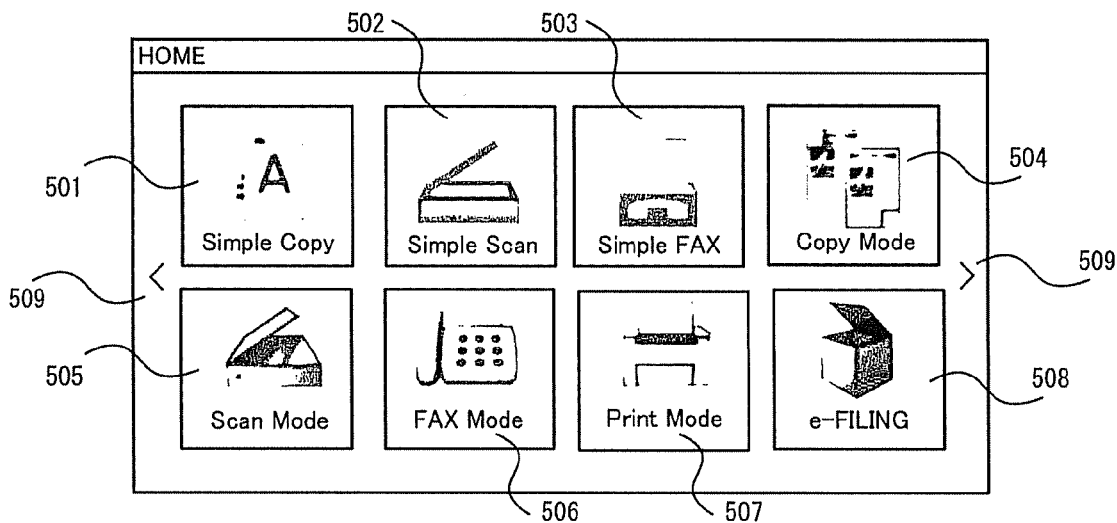
FIG. 2 is a diagram illustrating an example of a HOME screen.

FIG. 2 illustrates an example of a menu screen (referred to as a HOME screen) which is displayed in the touch panel display 106 and is on standby. The image forming apparatus 100 has a copying function, a scanning function, a FAX transmitting function, a printing function, and a filing function (e-filing). The copying function, the scanning function, the FAX transmitting function, and the printing function are basic functions that also are performed in the conventional image forming apparatus. The filing function is provided as a function to store individual data in a folder unique to a user.

When a job of using these functions is inserted, or after the job is inserted, a user needs to input a setting value and the touch panel display 106 can display a simple operation screen and a conventional operation screen for inputting a setting value, for each function. The conventional operation screen is an operation screen that is previously displayed in the image forming apparatus 100 and can cause detailed setting to be performed. The simple operation screen is a screen obtained by extracting only a frequently used setting operation from items enabling setting on the conventional operation screen and displaying the extracted setting operation.

A Simple Copy button 501, a Simple Scan button 502, a Simple FAX button 503, a Copy Mode button 504, a Scan Mode button 505, a FAX Mode button 506, a Print Mode button 507, and an e-FILNG button 508 are disposed on the HOME screen. The screen is scrolled right and left and a button which is not displayed in arrangement is displayed by operating the scroll button 509. A user presses a button indicating, for example, "Simple" such as Simple Copy button 501 and thus the touch panel display 106 displays the simple operation screen. The user presses a button indicating, for example, "Mode" such as Copy Mode button 504 and thus the touch panel display 106 displays the conventional operation screen. In the following descriptions, the copying function will be described, but the scanning function, the FAX transmitting function, and the printing function other than the copying function also have the simple operation screen and the conventional operation screen, similarly.

Figure 3:
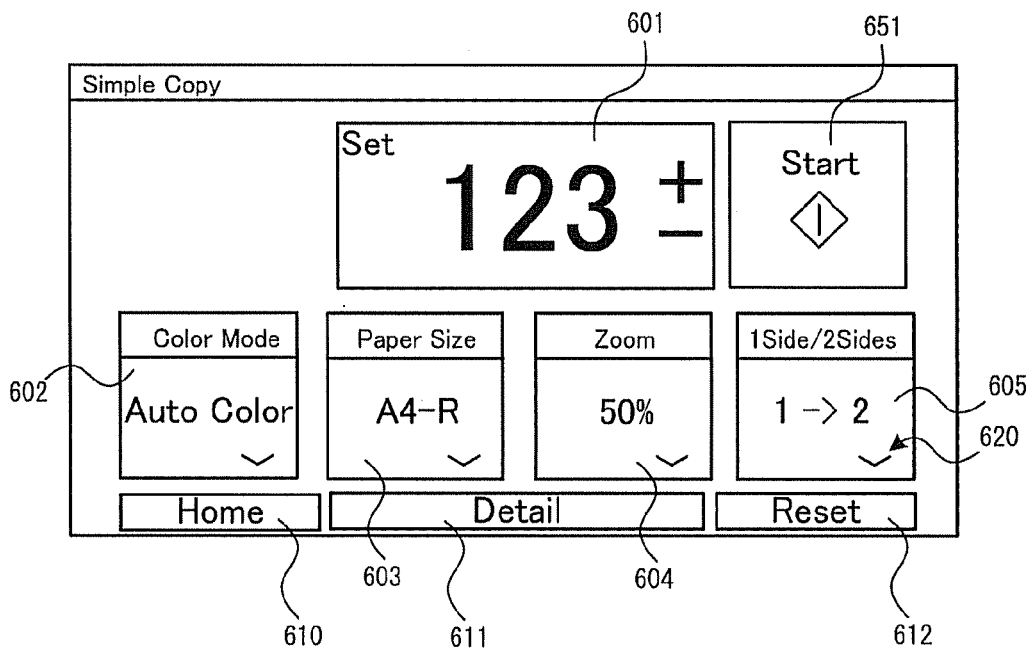
FIG. 3 is a diagram illustrating an example of a simple operation screen.

FIG. 3 illustrates an example of the simple operation screen when the Simple Copy button 501 is pressed. If the Simple Copy button 501 is pressed, the processor 101 executes, for example, a virtual machine or an analysis program of the HTML language, constructs the new environment 140 in order to execute the new program 162, and then the new program 162 is processed and executed. The processor 101 executes the new program 162 and thus controls the touch panel display 106 to display the operation screen in FIG. 3.

The Simple Copy screen illustrated in FIG. 3 has areas 601 to 605 for inputting a setting value. The area 601 is an area for setting the number of copies by pressing "+" button or "−" button or receiving an input from a ten-key pad (not illustrated). The area 602 is an area for setting whether an image is formed in monochrome, whether an image is formed in color, or whether a color is automatically recognized. The area 603 is an area for setting whether the size of a sheet is automatically set or is arbitrarily designated after copying. The area 604 is an area for setting an expansion and reduction ratio. The area 605 is an area for setting how much pages are allocated to one sheet. In the areas 602 to 605, an arrow 620 in each area is pressed, and thus settable values are displayed in a pull-down manner or a dialogue manner. The user sets a desired value by using the pull-down display or the dialogue screen.

Each setting is performed, and then if a START button 651 is pressed, the processor 101 controls the image forming unit 109 to perform a copying operation in accordance with the setting value.

Here, if the HOME button 610 is pressed, the processor 101 controls display so as to return to the HOME screen illustrated in FIG. 2 and if a Reset button 612 is pressed, the processor 101 resets the input setting value and controls the setting value to have a default value.

A setting item which is statistically higher ranked among settable items is disposed on the simple operation screen, and a setting item is disposed such that as the setting item becomes a higher rank, the setting item has a larger display area. In this example, since setting the number of copies is statistically the highest in general use, the area 601 for setting the number of copies is the largest area.

Figure 4:
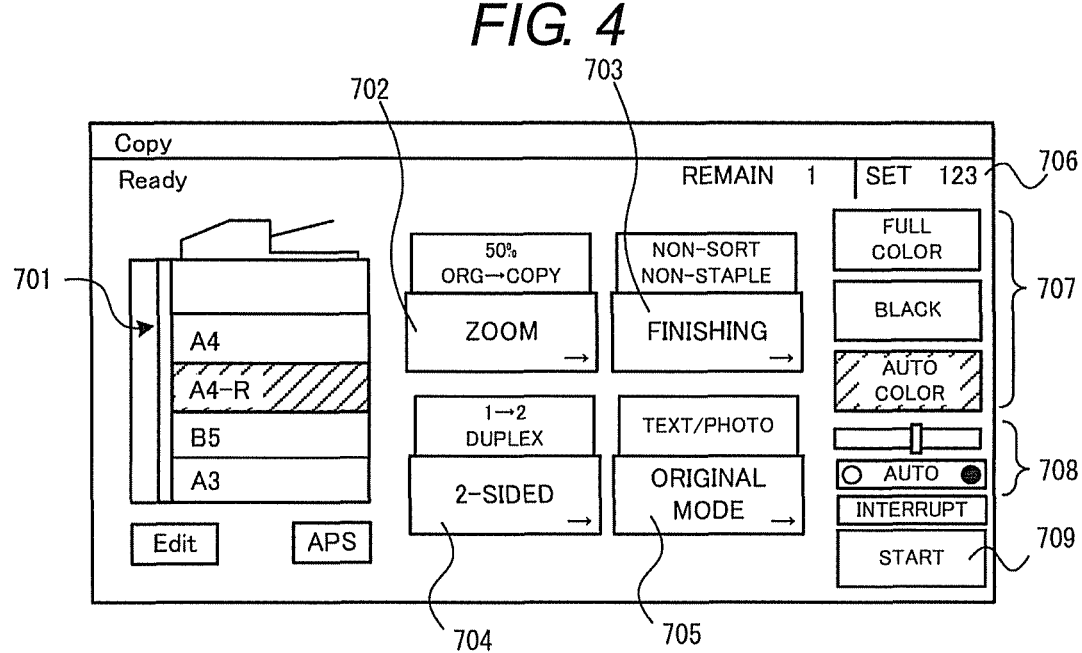
FIG. 4 is a diagram illustrating an example of a conventional operation screen.

The user presses a Detail button 611 when setting which cannot be performed in the Simple Copy screen illustrated in FIG. 3, such as setting of image quality and setting of a print concentration is intended to be performed. The processor 101 sets the previous environment 130 for executing the previous program 162, and processes and executes the previous program 152 by pressing the Detail button 611. The processor 101 controls the touch panel display 106 to display an operation screen illustrated in FIG. 4 by executing the previous program 152. The operation screen illustrated in FIG. 4 is the conventional operation screen and a screen for performing detailed setting which cannot be performed in the simple operation screen. A user that is used to use the conventional screen can directly proceed to display the conventional operation screen by pressing the Copy Mode button 504 of the HOME screen illustrated in FIG. 2.

The screen in FIG. 4 will be described. An area 701 is an area for setting whether the size of a sheet is automatically set or is arbitrarily designated after copying and in the area 701, a location of the selected size of a sheet is reversely displayed. An area 702 is an area for setting an expansion and reduction ratio. An area 703 is an area for setting whether or not a stapling process or a punch hole punching process (so-called post-process) is performed. An area 704 is an area for setting allocation and an area 705 is an area for setting image quality (image quality for a character or image quality for a picture). An area 706 is an area for setting the number of copiers and an area 707 is an area for setting a color or a monochrome or for setting whether a color is automatically recognized. An area 708 is an area for setting the concentration of a copier. Items which can be set in the areas 703 and 708 are items that are absent on the simple operation screen.

As illustrated in FIG. 4, the image forming apparatus 100 takes over the setting value of the size of a sheet, the expansion and reduction ratio, allocation setting, and a color mode, that is, the setting value set on the simple setting screen of FIG. 3, to the conventional operation screen. The new program 162 executed based on the new environment 140 writes the input setting value in the shared area 171 if the Detail button 611 is pressed. The previous program 152 reads the setting value written in the shared area 171 when an operation is started and the read setting value is applied to the previous program 152 and thus the previous program 152 is executed. Accordingly, the setting value is taken over between the programs. A data structure (whether data is created as binary data or text data, or a display format of the data) when the setting value is taken over is defined at a program creation stage so as to be suitable for the program.

If setting in the conventional operation screen of FIG. 4 is completed and a start button 709 is pressed, the image forming unit 109 performs a copying process.

Transition from the conventional operation screen in FIG. 4 to the simple setting screen in FIG. 3 is not performed in the exemplary embodiment. However, this screen transition may be allowable. In this case, an item which is allowed to be set in at least the simple setting screen is taken over through the shared area 171.

Figure 5:
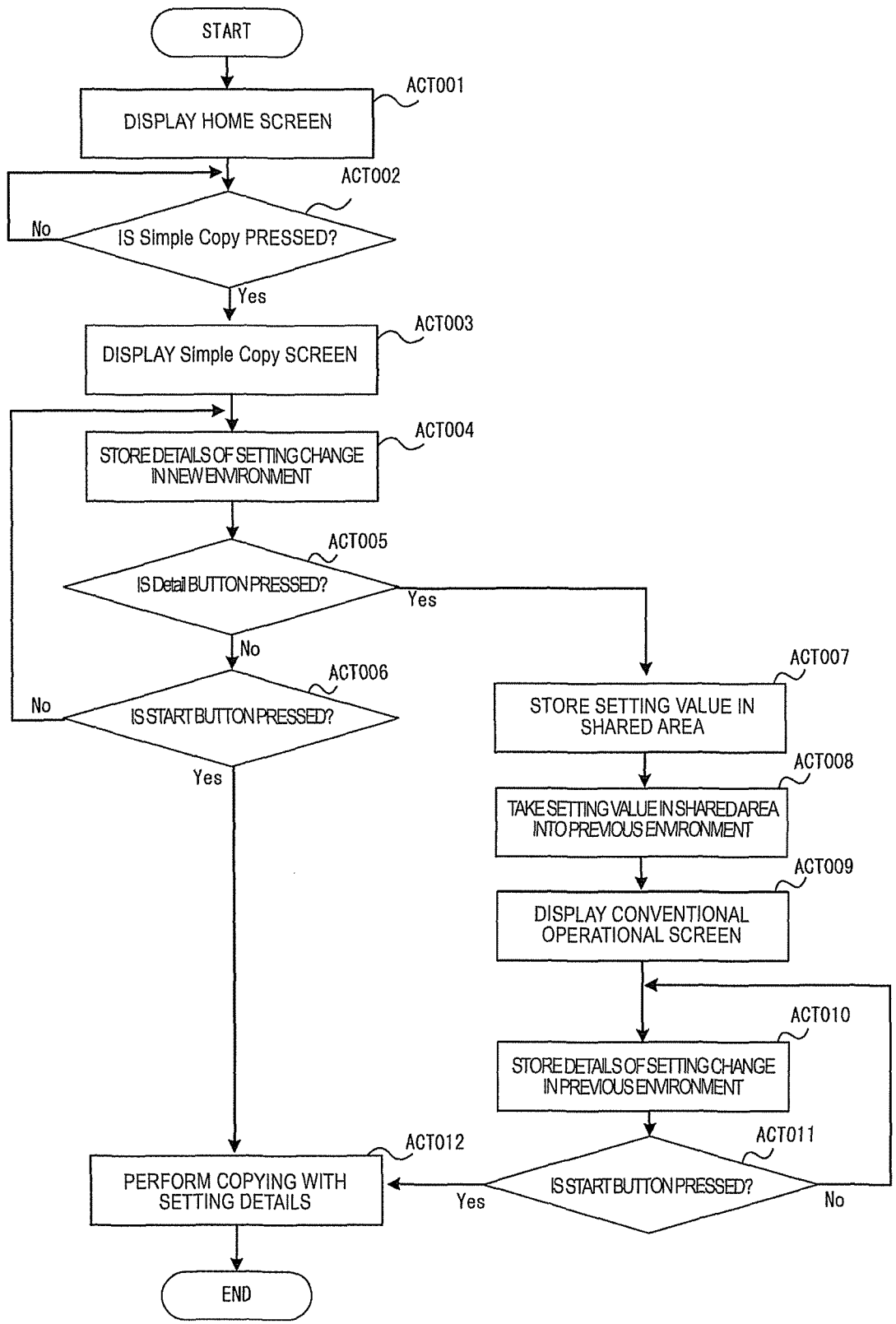
FIG. 5 is a flowchart illustrating an operation example of the image forming apparatus according to the exemplary embodiment.

FIG. 5 is a flowchart when the above-described operations of the image forming apparatus 100 are performed. Each operation in FIG. 5 is realized by the processor 101 processing and executing a program (previous program 152, new program 162, and the like) and cooperating with each of hardware. In this example, a case where a button other than the Simple Copy button 501 is pressed on the HOME screen will not be described, but the operations are similarly performed.

The processor 101 controls the touch panel display 106 to display the HOME screen which is a standby screen (ACT001). Display control of the HOME screen is set to be performed in the new environment 140, but may be performed in the previous environment 130.

The processor 101 waits until the Simple Copy button 501 is pressed (loop of No in ACT002).

If the Simple Copy button 501 is pressed (Yes in ACT002), the processor 101 controls the touch panel display 106 to display the simple operation screen (Simple Copy screen) relating to copying (ACT003). At this time, the processor 101 starts the new program 162 based on the new environment 140 and displays the Simple Copy screen.

When the touch panel display 106 receives a setting value, the processor 101 stores details of setting change in the new environment 140 in accordance with an input from the touch panel display 106 (ACT004). Hardware corresponding to a storage destination may be the RAM 102 or the HDD 104. The processor 101 determines whether the Detail button 611 is pressed (ACT005), and determines whether the START button 651 is pressed when the Detail button 611 is not pressed (ACT006). When the START button 651 is not pressed (No in ACT006), the processor 101 controls to return to the operation of ACT004. That is, the processor 101 repeats ACT004 until the Detail button 611 is pressed or until the START button 651 is pressed.

If the START button 651 is pressed (Yes in ACT006), the processor 101 controls the image forming unit 109 and the like to perform copying such that processing is performed with details which are set so far (ACT012). If the Detail button 611 is pressed (Yes in ACT005), the processor 101 temporarily stores the setting value in the shared area 171 of the HDD 104 in accordance with processing codes of the new program 162 (ACT007). The processor 101 starts the previous program 152 based on the previous environment 130 and takes the setting value which is stored in the shared area 171 in the previous environment 130 (ACT008). The processor 101 displays the conventional operation screen in accordance with processing codes of the previous program 152 (ACT009). At this time, the processor 101 applies the taken setting value to each item on the screen.

Then, when setting is changed based on the previous environment 130, the processor 101 stores the details (ACT010) ACT010 is repeated until the start button 709 is pressed (loop of No in ACT011). If the start button 709 is pressed (Yes in ACT011), the processor 101 controls the image forming unit 109 to perform copying in accordance with a final value set in both of the conventional environment and the new environment (ACT012).

In the above-described exemplary embodiment, an example is described in which a function selection button of the simple operation (simple copying, simple scanning, simple Fax transmitting) to which frequently used setting can be applied is provided in addition to a function selection button of the conventional operation (copying, scanning, Fax transmitting, and the like). Provision of a button (Detail button) for moving to the conventional operation on the simple operation screen is also described.

An example is described in which the display apparatus according to the exemplary embodiment performs transition to the conventional operation screen when the Detail button is pressed and all of job parameters which are set so far in the simple operation are taken over. It is possible to respond to a request of adding a little setting to the simple operation and executing a job by this screen switching or parameter taking over.

Figure 6:
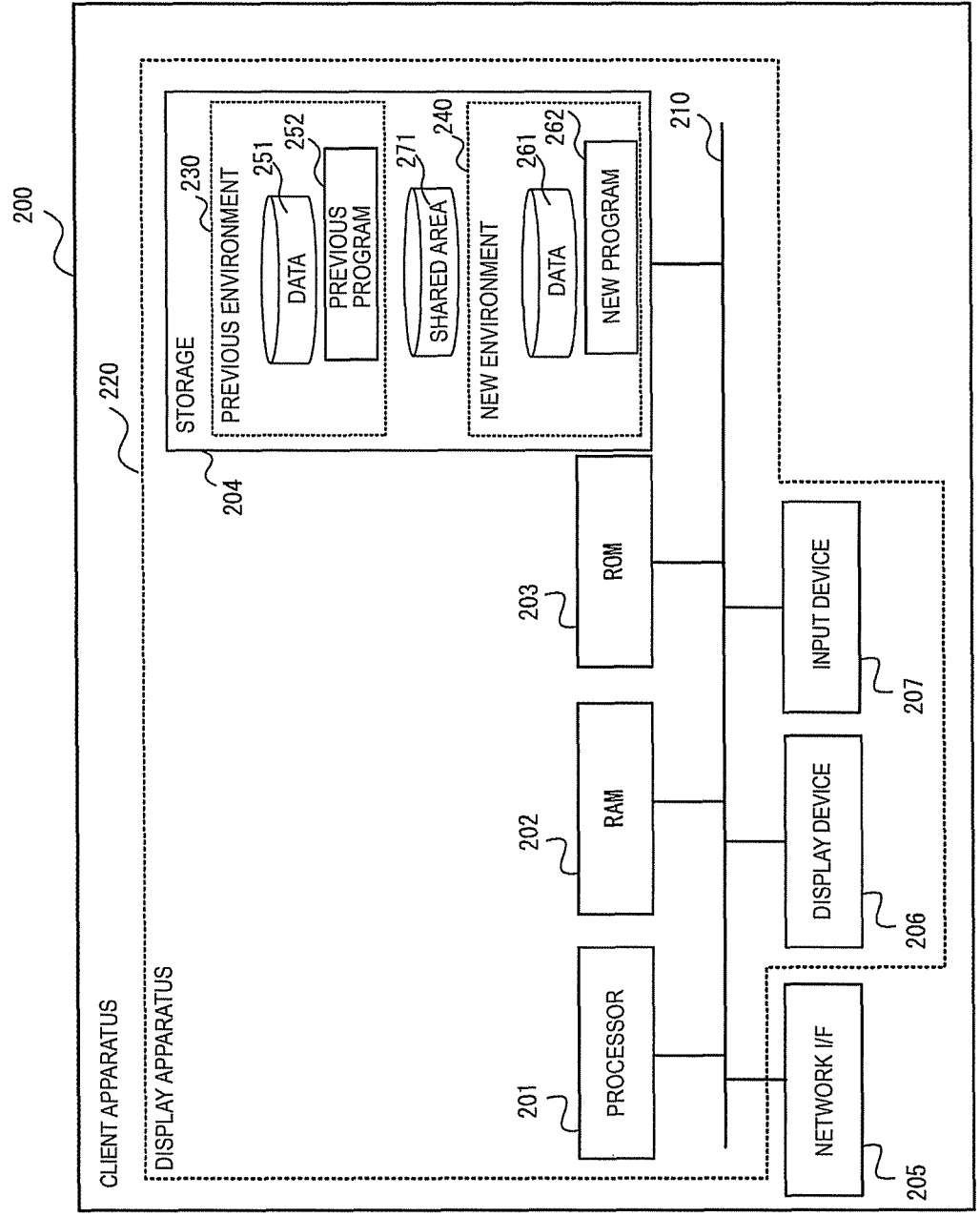
FIG. 6 is a block diagram illustrating a configuration example of a client apparatus which includes the display apparatus according to the exemplary embodiment.

In the above descriptions, a case where the display apparatus according to the exemplary embodiment is applied to the image forming apparatus is described. However, such a function of the display apparatus may be applied to other apparatuses. FIG. 6 is a block diagram illustrating a configuration example when the above-described display apparatus is applied to a client apparatus which is a computer. The client apparatus is a computer that requires the image forming apparatus to print an edited image or document, read data, and the like.

The client apparatus 200 includes a display apparatus 220 and a network I/F 205. The display apparatus 220 includes a processor 201, a random access memory (RAM) 202, a read only memory (ROM) 203, a hard disk drive (HDD) 204, a display device 206 such as a monitor, an input device 207 such as a keyboard and a mouse and includes a bus 210 for performing an input and output between units in the client apparatus 200. The display apparatus 220 may include a touch panel display instead of the display device 206 and the input device 207 or include a touch panel display along with the display device 206 and the input device 207.

The processor 201, the RAM 202, and the ROM 203 have an equivalent function to each unit described in the image forming apparatus 100.

The HDD 204 is a non-volatile auxiliary storage device that stores data or a program. The HDD 204 stores a previous environment 230 and a new environment 240 and stores a previous program 252 which is operated in the previous environment 230 and data 251, and a new program 262 which is operated in the new environment 240 and data 261, similarly to the image forming apparatus 100. With the configuration of the display apparatus 220 illustrated in FIG. 6, the above-described setting operations can be performed before a job is inserted into the image forming apparatus.

In the example, a non-volatile storage device is used as a data transfer medium and a setting value is taken over. However, a shared memory may be used by using communication between processors and a setting value may be taken over.

In the example, an example is described in which data is taken over between the two environments, the two programs, and the two setting screens. However, it is not limited thereto, data may be taken over between three environments or more, three programs or more, and three setting screens or more.

In each exemplary embodiment, a case where a function of implementing an aspect in the apparatus is stored in advance is described. However, it is not limited thereto, the similar function may be downloaded from a network to the apparatus or the similar function which is stored in a recording medium may be installed. The recording medium may have any form as long as the recording medium causes a program to be stored in a CD-ROM and the like and allows the apparatus to read the stored program. The function obtained by performing installing or downloading in advance in this manner may cooperate with an operating system (OS) and the like in the apparatus and be realized.

According to the exemplary embodiment, it is possible to transfer an operation setting value of an image forming apparatus between modules having different operational environments from each other or between setting screens and to suppress re-input of data.

What is claimed is:

1. A display apparatus comprising:
a processor for executing instructions to perform operations, comprising:
obtaining data from a user in accordance with an operation from the user;
facilitating displaying on a display device a first setting screen and a second setting screen, the first setting screen which is for receiving a setting value of a job inserted into an image forming apparatus, and displays execution in a first operational environment, and the second setting screen which is for receiving a setting value of the job, displays execution in a second operational environment different from the first operational environment, and displays a smaller number of setting items than that of the first setting screen; and
controlling the display device to display the second setting screen, and controlling the display device to display the first setting screen obtained by applying a setting value obtained through the second setting screen when the user presses a defined button in the second setting screen, wherein the controlling further comprises storing the setting value obtained through the second setting screen in a storage unit, obtaining the setting value stored in the storage unit, and applying the obtained setting value to the first setting screen when the first setting screen is displayed, and wherein the storage unit has a storage area formed in a file system which enables reading and writing in each of the first operational environment and the second operational environment, and the setting value is stored in the storage area.

2. The apparatus according to claim 1, wherein each setting item is disposed on the second setting screen such that an item that has a greater frequency of use occupies a large display area.

3. A display method of a display apparatus, comprising:
obtaining, by a system comprising a processor, data from a user in accordance with an operation from the user;
facilitating displaying, by the system, a first setting screen and a second setting screen, the first setting screen which is for receiving a setting value of a job inserted into an image forming apparatus, and displays execution in a first operational environment, and the second setting screen which is for receiving a setting value of the job, displays execution in a second operational environment different from the first operational environment, and displays a smaller number of setting items than that of the first setting screen;
controlling, by the system, the displaying to display the second setting screen, and controlling the displaying to display the first setting screen obtained by applying a setting value obtained through the second setting screen when the user presses a defined button in the second setting screen;
the controlling further comprising storing the setting value obtained through the second setting screen in a storage unit, obtaining the setting value stored in the storage unit, and applying the obtained setting value to the first setting screen when the first setting screen is displayed;
facilitating the storage unit to form a storage area in a file system which enables reading and writing in each of the first operational environment and the second operational environment; and
causing the setting value to be stored in the storage area.

4. A non-transitory storage medium that stores a program causing an apparatus to perform execution of operations, comprising:
obtaining data from a user in accordance with an operation from the user;
facilitating displaying a first setting screen and a second setting screen, the first setting screen which is for receiving a setting value of a job inserted into an image forming apparatus, and displays execution in a first operational environment, and the second setting screen which is for receiving a setting value of the job, displays execution in a second operational environment different from the first operational environment, and displays a smaller number of setting items than that of the first setting screen; and
controlling the displaying of the second setting screen, and the displaying of the first setting screen by applying a setting value obtained through the second setting screen when the user presses a defined button on the second setting screen, wherein the controlling further comprises storing the setting value obtained through the second setting screen in a storage unit, obtaining the setting value stored in the storage unit, and applying the obtained setting value to the first setting screen when the first setting screen is displayed, and wherein the storage unit has a storage area formed in a file system which enables reading and writing in each of the first operational environment and the second operational environment, and the setting value is stored in the storage area.

\* \* \* \* \*